(12) United States Patent
Zook

(10) Patent No.: US 7,235,892 B2
(45) Date of Patent: Jun. 26, 2007

(54) LOAD-BASED QUADRATIC COMPENSATOR GAIN ADJUSTMENT

(75) Inventor: Scott A. Zook, Martinsville, IN (US)

(73) Assignee: Cummins, Inc., Columbus, IN (US)

(*) Notice: Subject to any disclaimer, the term of this patent is extended or adjusted under 35 U.S.C. 154(b) by 78 days.

(21) Appl. No.: 11/223,056

(22) Filed: Sep. 9, 2005

(65) Prior Publication Data

US 2007/0057512 A1   Mar. 15, 2007

(51) Int. Cl.
*H02P 9/04*   (2006.01)
(52) U.S. Cl. ............... 290/40 A; 290/41; 290/40 B
(58) Field of Classification Search ........... 290/40 R, 290/41, 40 A, 40 B, 40 C; 123/352, 357; 60/32.02, 39.29; 322/7
See application file for complete search history.

(56) References Cited

U.S. PATENT DOCUMENTS

| | | | |
|---|---|---|---|
| 4,051,669 A | 10/1977 | Yannone et al. | |
| 4,059,770 A | 11/1977 | Mackay | |
| 4,087,961 A | 5/1978 | Avery | |
| 4,136,286 A | 1/1979 | O'Halloran et al. | |
| 4,749,944 A | 6/1988 | Okamoto | |
| 5,313,778 A * | 5/1994 | Sweet et al. ............ | 60/772 |
| 5,553,589 A | 9/1996 | Middleton et al. | |
| 5,577,474 A * | 11/1996 | Livshiz et al. ........... | 123/352 |
| 5,596,972 A * | 1/1997 | Sultan et al. ........... | 123/520 |
| 5,606,948 A | 3/1997 | Gonnering | |
| 5,751,069 A * | 5/1998 | Rajashekara et al. ..... | 290/40 C |
| 5,901,683 A * | 5/1999 | Patel ..................... | 123/352 |
| 5,973,481 A * | 10/1999 | Thompson et al. .......... | 322/7 |
| 6,089,207 A | 7/2000 | Goode et al. | |
| 6,167,979 B1 | 1/2001 | Taylor et al. | |
| 6,189,523 B1 | 2/2001 | Weisbrod et al. | |
| 6,202,629 B1 | 3/2001 | Zhu et al. | |
| 6,380,639 B1 * | 4/2002 | Soucy ..................... | 290/40 B |
| 6,425,370 B1 | 7/2002 | Kramer | |
| 6,441,506 B2 * | 8/2002 | Nakashima ............... | 290/40 C |
| 6,476,510 B2 * | 11/2002 | Soucy ..................... | 290/40 C |
| 6,543,242 B2 | 4/2003 | Reason et al. | |
| 6,729,139 B2 | 5/2004 | Desai et al. | |
| 6,876,097 B2 | 4/2005 | Thomas et al. | |
| 6,969,922 B2 * | 11/2005 | Welches et al. ........... | 290/1 A |
| 7,045,913 B2 * | 5/2006 | Ebrahim et al. ........... | 290/52 |
| 2005/0140142 A1 | 6/2005 | Welches et al. | |

* cited by examiner

*Primary Examiner*—Nicholas Ponomarenko
(74) *Attorney, Agent, or Firm*—Krieg DeVault LLP; J. Bruce Schelkopf; L. Scott Paynter

(57) ABSTRACT

One embodiment includes an internal combustion engine, a sensor signal representative of an observed engine speed, and a controller. This controller is responsive to the sensor signal to determine a control input representative of a difference between the observed engine speed and a desired engine speed. The controller defines a compensator that is one or more of a proportional-integral type, a proportional-derivative type, and a proportional-integral-derivative type. The controller determines at least one gain factor of the compensator with a signal corresponding to engine load. The compensator is responsive to the control input to generate an output signal to adjust engine fueling as a function of the control input and the gain factor.

20 Claims, 3 Drawing Sheets

LOAD-BASED QUADRATIC COMPENSATOR GAIN ADJUSTMENT

BACKGROUND

The present invention relates to engine control, and more particularly, but not exclusively, relates to gain adjustment for a quadratic proportional-integral-derivative compensator to regulate operation of an internal combustion engine that drives an electric power generator.

In certain internal combustion engine systems, it is desirable to minimize variation of engine speed despite significant changes in load. While various isochronous control schemes have been developed, in certain applications there is still room for improvement. Thus, a need persists for further contributions in this area of technology.

SUMMARY

One embodiment of the present invention includes a unique engine control technique. Other embodiments include unique apparatus, devices, systems, and methods to control an engine. Further embodiments, forms, objects, features, advantages, aspects, and benefits of the present application shall become apparent from the detailed description and figures included herewith.

DETAILED DESCRIPTION OF SELECTED EMBODIMENTS

Figure 1:
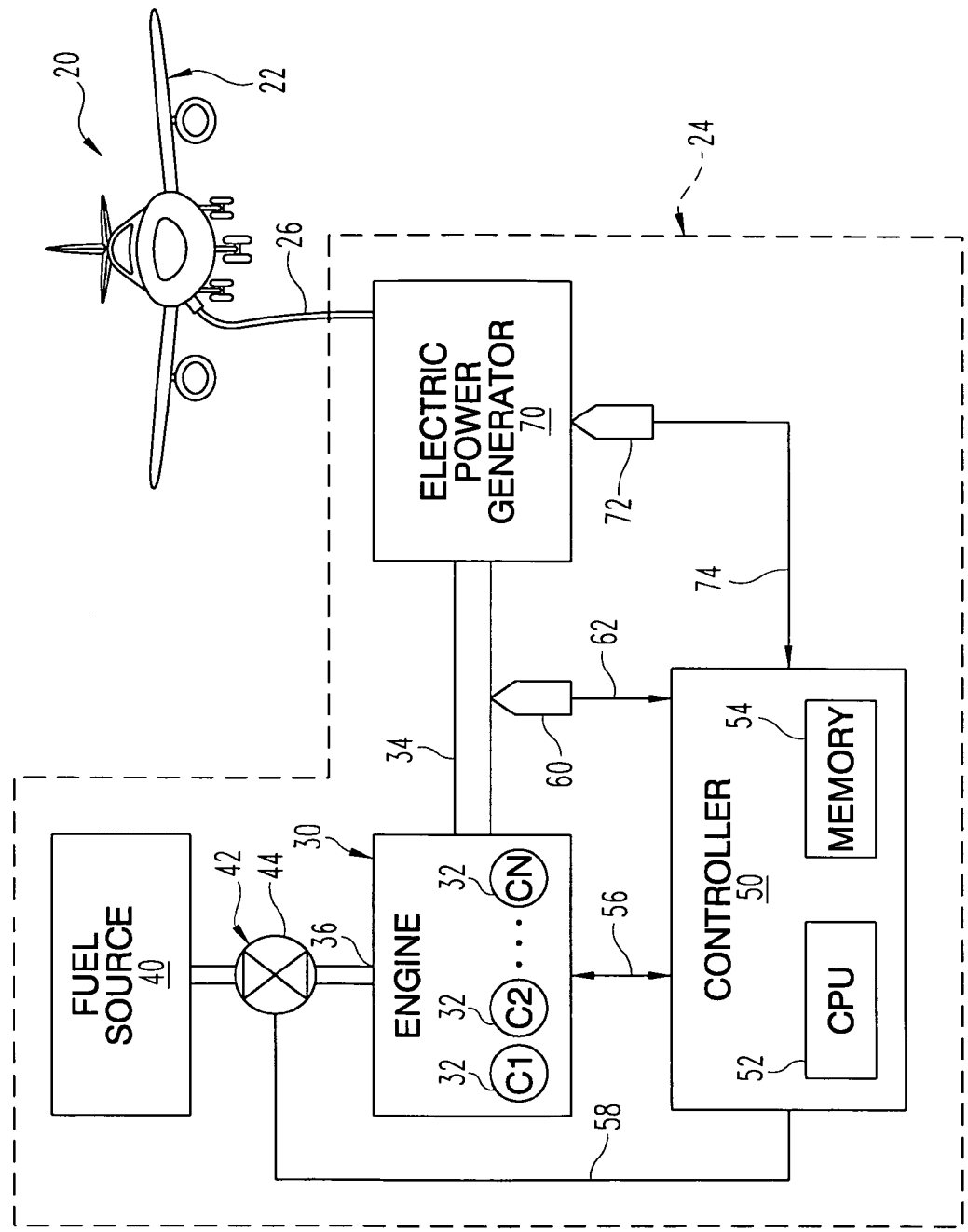
FIG. 1 is a diagrammatic view of a system according to one embodiment of the present invention.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

FIG. 1 depicts an auxiliary power system 20 of one embodiment of the present invention. The system 20 includes an aircraft 22 and electric power generation equipment 24. The electric power generation equipment 24 is configured to provide auxiliary electrical power to the aircraft 22 through power connection 26 when the aircraft 22 is located on the ground in a parked position, as might occur during servicing, freight loading and unloading, and/or passenger loading and unloading between flights. The electric power generation equipment 24 provides Alternating Current (AC) electrical power at a frequency within a desired range. Generally, it is desired to maintain the frequency within a relatively small range despite substantial changes in electrical loading of equipment 24. While equipment 24 is used to provide auxiliary power to aircraft 22 in the depicted embodiment, it can be structured to provide AC electricity for other applications, such as emergency/backup power generation for a building, outdoor portable electric power generation, or the like.

The electric power generation equipment 24 includes an internal combustion engine 30, a fuel source 40, a controller 50, and an electric power generator 70. The internal combustion engine 30 is of the multicycle, reciprocating piston type with combustion chambers and corresponding cylinders 32 that intermittently contribute power in accordance with an intermittent combustion pattern. The engine 30 operates as the prime mover of the electric power generator 70. The cylinders 32 of engine 30 are more specifically designated cylinders C1, C2, . . . CN. It should be appreciated that engine 30 is schematically represented and that more or fewer cylinders 32, combustion chambers, and corresponding pistons may be employed as would occur to one skilled in the art. In one form, the engine 30 is of the four stroke, diesel-fueled type with compression ignition. In other embodiments, engine 30 can be of a spark-ignited type, the two-stroke type, and/or a rotary type, to name just a few alternative possibilities.

The engine 30 is mechanically coupled to the electric power generator 70 through a power shaft 34. In other embodiments of the present invention, the engine 30 may engage the electric power generator 70 through a gearbox, clutch, torque converter, or other mechanical linkage as would occur to one skilled in the art. As the engine 30 operates, the power shaft 34 rotates, providing mechanical power to the electric power generator 70. The electrical power generator converts the rotational mechanical power provided by the shaft 34 to AC electricity.

The engine 30 receives fuel from the fuel source 40 through the fuel input 36 of the engine 30. Fuel may be provided through one or more injection techniques and/or through carburetion to name just a few possibilities. The fuel may be of any type, including but not limited to gasoline, as gaseous fuel (a fuel that is in gas phase at standard temperature and pressure such as natural gas), diesel fuel, ethanol, or a hybrid combination of fuel types. A fuel device 42 is located between the fuel source 40 and the fuel input 36. The fuel device 42 includes a controllable fuel valve 44 that regulates the flow of fuel from the fuel source 40 to the fuel input 36 of the engine 30. The controllable fuel valve 44 modulates fuel flow in accordance with a control signal from a controller 50.

The controller 50 includes a central processing unit 52 and memory 54. Controller 50 can be an electronic circuit comprised of one or more components, including digital circuitry, analog circuitry, or both. Controller 50 may be a software and/or firmware programmable type; a hardwired, dedicated state machine; or a combination of these. In one embodiment, controller 50 is a programmable microcontroller solid-state integrated circuit that integrally includes processing unit 52 and memory 54. Memory 54 can be comprised of one or more components and can be of any volatile or nonvolatile type, including the solid state variety, the optical media variety, the magnetic variety, a combination of these, or such different arrangement as would occur to those skilled in the art. Further, while only one processing unit 52 is specifically shown, more than one such unit can be included. When multiple processing units are present, controller 52 can be arranged to distribute processing among such units, and/or to provide for parallel or pipelined processing if desired. Controller 50 functions in accordance with operating logic defined by programming, hardware, or a combination of these. In one form, memory 54 stores programming instructions executed by processing unit 52 of controller 50 to embody at least a portion of this operating logic. Alternatively or additionally, memory 54 stores data that is manipulated by the operating logic of controller 50. Controller 50 can include signal conditioners, signal format converters (such as analog-to-digital and digital-to-analog converters), limiters, clamps, filters, and the like as needed to perform various control and regulation operations described in the present application.

The controller 50 is connected to and communicates with various devices of the engine 30, controllable fuel valve 44, engine speed sensor 60, and generator sensor 72 through corresponding signal pathways. The controller 50 receives inputs from and sends outputs to the various devices of the engine 30 through engine control signal pathways 56. The controller 50 receives input signals from the engine speed sensor 60 through the speed sensor input signal pathway 62. The engine speed sensor 60 provides a signal corresponding to rotational speed of the engine crankshaft (not shown) and power shaft 34. While shown adjacent to the power shaft 34, it should be appreciated that the engine speed sensor 60 can be of a type that quantitatively detects revolution of any rotating member of the engine 30 from which engine speed can be derived. The controller 50 receives input signals from the generator sensor 72 through a generator sensor input signal pathway 74 to monitor the electricity output by generator 70. The controller 50 sends control signals to the controllable fuel valve 44 via signal pathway 58.

Figure 2:
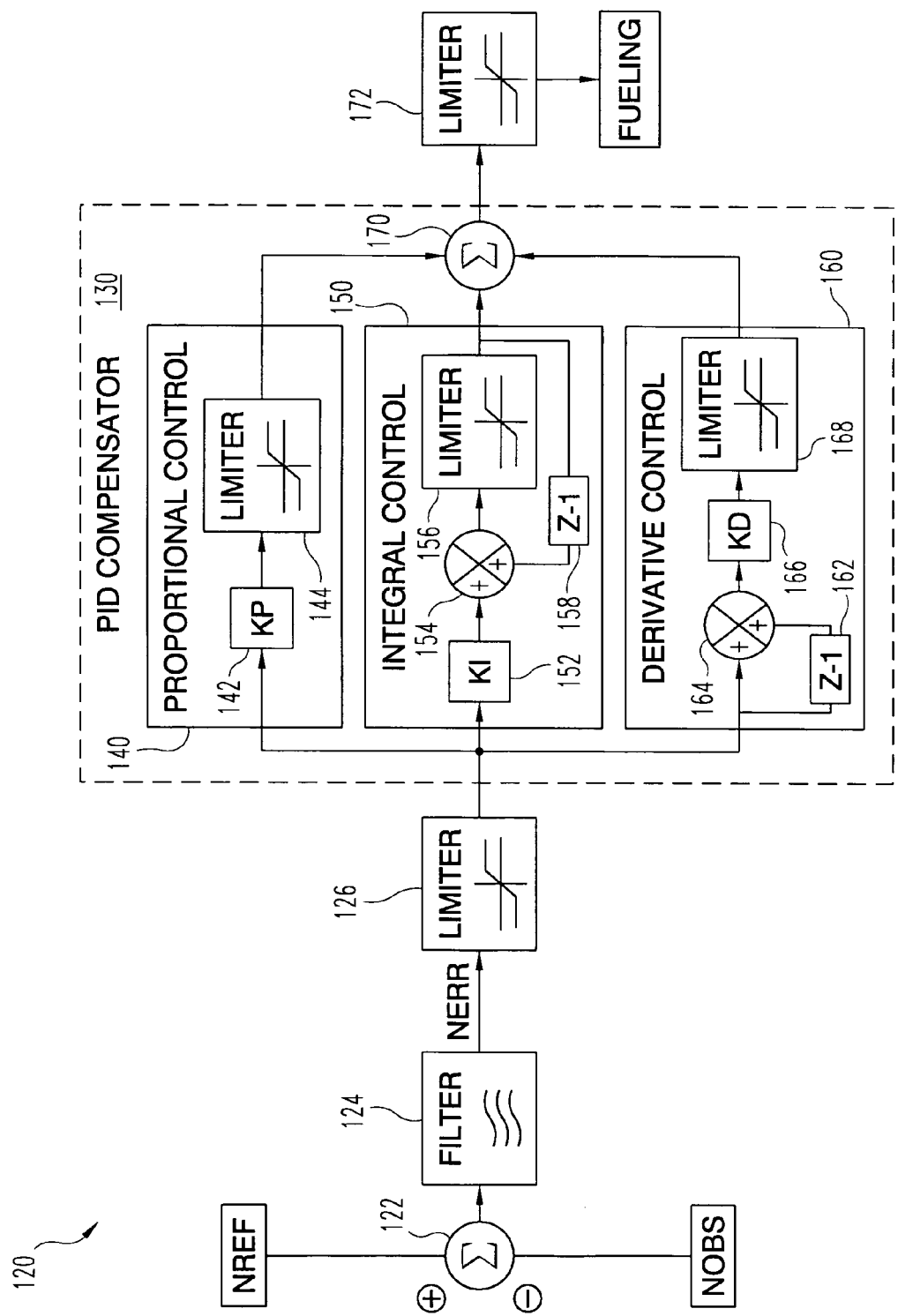
FIG. 2 is a control flow diagram illustrating an engine regulator included in the system of FIG. 1.

FIG. 2 depicts an engine regulator 120 according to one embodiment of the present invention to provide isochronous engine operation for system 20, and correspondingly provide a generally constant rotational drive for generator 70 despite changes in load. Accordingly, AC frequency output by generator 70 remains approximately constant despite changes in loading. The engine regulator 120 can be implemented through programming and/or hardware operating logic of controller 50. The engine regulator 120 includes summation operators 122 and 170, filter 124, limiters 126 and 172, and a Proportional-Integral-Derivative (PID) compensator 130. The summation operator 122 has two input signals: a reference rotational engine speed represented as signal NREF and an observed engine speed represented as signal NOBS, as shown in FIG. 2. The NOBS input signal is determined from the engine speed sensor 60. The summation operator 122 determines the difference between the NREF signal and the NOBS signal (NREF−NOBS) and provides a corresponding output to the filter 124. The filter 124 is of a low pass type that smoothes the difference signal (NREF−NOBS) output by the summation operator 122 to reduce or eliminate high frequency noise and other minor signal excursions.

The filter 124 provides a filtered output of the difference signal, which is designated as an NERR signal. The NERR signal is input to the limiter 126. The limiter 126 maintains the NERR signal between designated minimum and maximum signal level values, operating as a clamp. The clamped NERR signal is then sent from the limiter 126 to the PID compensator 130. The PID compensator 130 acts on the clamped NERR signal to produce a fuel control signal output corresponding to fueling of engine 30. This fuel control signal is sent from the PID compensator 130 to the limiter 172 that maintains the level of the fuel control signal between designated minimum and maximum signal values. The resulting output of the limiter 172 is the FUELING signal that is provided to the controllable fuel valve 44 of the fuel device 42 along pathway 58.

The PID compensator 130 includes a proportional control 140, an integral control 150, a derivative control 160, and a summation operator 170. The NERR signal from the limiter 126 is input to each of the controls 140, 150, and 160 respectively, from which corresponding proportional, integral, and derivative outputs are provided. These output signals are input to the summation operator 170. The summation operator 170 combines the output signals from the controls 140, 150, and 160 to form the fuel control signal provided to limiter 172.

The proportional control 140 of compensator 130 contributes a proportional gain function that responds with engine fueling changes through the FUELING signal. These changes are proportional to the degree of the input engine speed control error represented by the NERR signal. The proportional control 140 includes a KP gain block 142 and a limiter 144. The KP gain block 142 is a multiplication operator that applies a KP gain to the NERR signal input. The KP gain value is provided by gain logic 220 shown and described in connection with FIG. 3 hereinafter. The output of the KP gain block 142 is input to the limiter 144. The limiter 144 clamps the input signal to signal levels within designated minimum and maximum signal values. The output of limiter 144 is provided to summation operator 170 to be combined with the outputs of the other controls 150 and 160.

The integral control 150 of compensator 130 contributes an integral function to smooth changes in the FUELING signal over time relative to engine speed changes represented by the NERR signal. The integral control 150 includes a KI gain block 152, a summation operator 154, a limiter 156, and a discrete delay operator 158. The KI gain block 152 is a multiplication operator that applies a KI gain value to the input NERR signal. The KI gain value is also provided by the gain logic 220 shown and described in connection with FIG. 3. The output of the KI gain block 152 is input to summation operator 154. Summation operator 154 sums this input with an earlier-determined (prior) output of control 150, as provided by delay operator 158. The discrete delay operator 158 is connected between the summation operator 154 and the output of the integral control 150. Summation with this prior output signal from delay operator 158 provides a discrete form of integration with respect to time. The output of summation operator 154 is fed into a limiter 156. The limiter 156 clamps signal level between designated minimum and maximum signal level values. The output of the limiter 156 is provided to the summation operator 170 to be combined with the outputs of the other controls 140 and 160.

The derivative control 160 of compensator 130 contributes a derivative function to anticipate rate and direction of change (increase or decrease) in the FUELING signal relative to engine speed changes represented by the NERR signal. The derivative control 160 includes a discrete delay operator 162, a summation operator 164, a KD gain block 166, and a limiter 168. The summation operator 164 combines the NERR signal input with a delayed form of the NERR signal input provided by discrete delay operator 162. The discrete delay operator 162 is connected between the input to the derivative control 160 and the summation operator 164. The summation of current and delayed signals provides a discrete derivative function with respect to time. The combined signal from summation operator 164 is input to the KD gain block 166. The KD gain block 166 is a multiplication operator that applies a KD gain value to the output of summation operator 164. The KI gain value is also provided by the gain logic 220 shown and described in connection with FIG. 3. The output of the KD gain block 166 is input to the limiter 168. The limiter 168 clamps the input signal level between designated minimum and maximum signal level values. The output of the limiter 168 is provided to the summation operator 170 to be combined with the outputs of the other controls 140 and 150.

Figure 3:
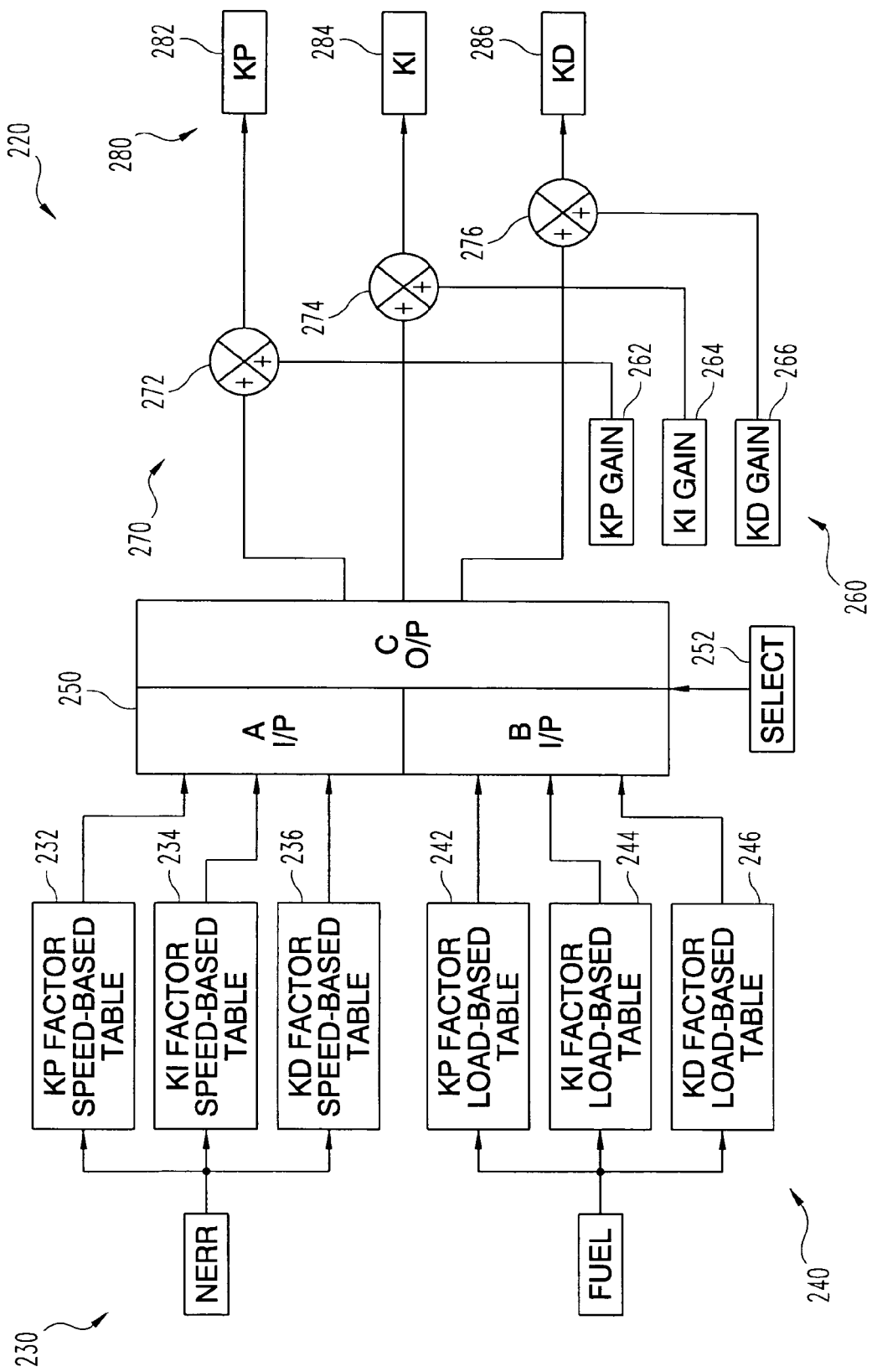
FIG. 3 is a control flow diagram illustrating gain selection logic for a proportional-integral-derivative compensator included in the regulator of FIG. 2.

FIG. 3 depicts the gain logic 220 for providing KP, KI, and KD gains to be applied in the gain blocks 142, 152, 166 shown in FIG. 2, respectively. As in the case of regulator 120 generally, logic 220 can be implemented in the form of programming, and/or hardware operating logic of controller 50. The gain logic 220 receives the NERR signal and a FUEL signal as inputs. As previously described, the NERR signal corresponds to the difference between the NREF input signal and the NOBS input signal. The FUEL signal is a controller signal representative of a current engine fuel level and may be the same as or derived from the FUELING signal. It should be appreciated that the FUEL signal is representative of the load placed on the engine 30 by generator 70, and correspondingly is representative of electrical loading of generator 70. Thus the FUEL controller signal corresponds to loading in system 20.

The NERR and FUEL signals are each provided to a different set of look-up tables: an engine speed-based look-up table set 230 and a load-based look-up table set 240, respectively. Set 230 includes three look-up tables: a KP factor speed-based table 232, a KI factor speed-based table 234, and a KD factor speed-based table 236. Tables 232, 234, and 236 each store values corresponding to KP, KI, and KD gain factors. A particular factor is selected for each of the tables 232, 234, and 236 based on the input signal NERR. Set 240 includes three look-up tables: a KP factor load-based table 242, a KI factor load-based table 244, and a KD factor speed-based table 246. Tables 242, 244, and 246 each store values corresponding to KP, KI, and KD gain factors. A particular factor is selected for each of the tables 242, 244, and 246 based on the input signal FUEL. The gain factors of the tables 232, 234, 236, 242, 244, and 246 may be stored in memory 54 or incorporated in other hardware. In other embodiments, gain factors may be calculated from one or more mathematical expressions in lieu of or in addition to look-up table determination. In one form, PID 130 is based on KP, KI, and KD gain factors determined from a quadratic relationship.

The gain factors generated by the speed-based look-up table set 230 and load-based look-up table set 240 are sent to a table set selector 250. The table set selector 250 includes Input (I/P) channel "A" representing the three KP, KI, and KD gain factors generated by the speed-based look-up table set 230, I/P channel "B" representing the three KP, KI, and KD gain factors generated by the load-based look-up table set 240, and Output (O/P) channel "C" representing the output of the table set selector 250. Selector 250 is responsive to a SELECT signal input 252 to route I/P channel A to O/P channel C or to route I/P channel B to O/P channel C. The KP, KI, and KD gain factors from O/P channel C of the table set selector 250 are then used as corresponding inputs to each of a number of gain multipliers 270. The gain multipliers 270 include a KP gain multiplier 272, KI gain multiplier 274, and KD gain multiplier 276. A base gain set 260 provides another set of inputs to the multipliers 270. The base gain set 260 includes the KP gain 262, the KI gain 264, and the KD gain 266. In one form, the base gains of set 260 are constants that are modified by the selected factors with the multipliers 270. More specifically, the multipliers 270 include multiplication operators 272, 274, and 276 that multiply the KP, KI, and KD gain factors from the table set selector 250 by the corresponding KP, KI, and KD base gains 262, 264, and 266 to generate respective KP, KI, and KD gain outputs 280. The gain outputs 280 from the multiplications operators 272, 274, and 276 are the gains applied in the PID compensator 130 as previously described in connection with FIG. 2.

Referring to FIGS. 1–3 generally, engine 30 is isochronously controlled to provide a regulated power shaft rotational speed that correspondingly drives generator 70 to provide a stable electrical output frequency that remains within a desired range. As the electric power generation equipment 24 supplies AC electrical power to aircraft 22, it should be appreciated that loading can abruptly change causing a significant change in engine speed that is represented by the level of the engine speed error signal NERR. Correspondingly, fuel adjustments are made with regulator 120 via the FUELING signal to correct for engine speed change and corresponding reduce any resulting change in the frequency of the electricity provided by generator 70. In accordance with the SELECT signal input 252, KP, KI, and KD gain factors are applied based on engine speed or engine loading. These factors refine the corresponding base gains to refine the performance of the PID compensator 130 in accordance with engine speed or loading. Indeed, it has been surprisingly discovered that gain factor determination based on load, as represented by the FUEL controller signal can provide a desired degree of AC frequency stabilization despite significant load changes.

There are many different embodiments of the present invention envisioned. For example, in one alternative, sensor 72 can be structured to provide a signal corresponding to generator electric power frequency that is also indicative of engine speed in addition to or in lieu of sensor 60. In another example, a different signal corresponding to loading is used, such as electric current of generator 70 detected with sensor 72. In a further example, only load-based gain factor determination is performed, without the speed-based alternative. Such embodiments can include load-based gain factor look-up tables, mathematical expressions to determine the load-based gain factors, approaches, and/or a different load-based gain factor selection technique. Alternatively or additionally, an alternative type of compensator is used, such as a Proportional-Integral (PI) control type or a Proportional-Derivative (PD) control type to name just a couple of the possibilities. In further examples, the isochronous engine control described herein is applied in whole or in part in different applications, such as marine vehicles, pumps, or the like. In yet other examples, different types of control techniques, governors, or the like, can utilize the compensation arrangement of the present application for nonisochronous applications.

A further example includes an internal combustion engine that is regulated with a control to maintain engine speed within a desired range despite variation in engine load. This control is responsive to an input representative of a change in speed of the engine and includes one or more gain factors determined with a control signal representative of the engine load. The control adjusts fuel provided to the engine as a function of the input and the one or more gain factors.

Another example includes: driving an electric power generator with an internal combustion engine to provide AC electric power at a frequency within a selected range, and regulating operation of the engine with a control to maintain the frequency of the electric power within the selected range during variation in engine load caused by the generator. This regulation can include: providing an input signal to the control that is representative of a change in speed of the engine in response to the variation in engine load, determining one or more gain factors of the control as a function of a signal representative of the engine load, and adjusting fuel provided to the engine in response to the control as a function of the input signal and the one or more gain factors of the control.

Still another example includes: providing an internal combustion engine with one or more of a proportional-integral control, a proportional-derivative control, and a proportional-integral-derivative control; generating an input control signal representative of a difference between a sensed engine speed and a desired engine speed; determining one or more gain factors for the one or more of the proportional-integral control, the proportional-derivative control, and the proportional-integral-derivative control in response to an engine fueling signal; and controlling engine fueling in response to an output signal determined as a function of the one or more gain factors and the input control signal with the one or more of the proportional-integral control, the proportional-derivative control, and the proportional-integral-derivative control.

A different example includes an internal combustion engine with a control of one or more of a proportional-integral type, a proportional-derivative type, and a proportional-integral-derivative type. Also included are means for generating an input control signal representative of a difference between a sensed engine speed and a desired engine speed; means for determining one or more gain factors for the control; and means for controlling engine fueling in response to an output determined as a function of the one or more gain factors and the input control signal with the control.

Still a further example includes an electric power generator with an internal combustion engine to provide AC electric power at a frequency within a selected range and means for regulating operation of the engine with a control to maintain the frequency within the selected range during variation in engine load caused by the generator. This regulating means can include: means for providing an input signal to the control that is representative of a change in speed of the engine in response to the variation in engine load, means for determining one or more gain factors of the control as a function of a control signal representative of the engine load, and means for adjusting fuel provided to the engine in response to the control as a function of the input signal and the one or more gain factors.

Yet a different example includes a system with an internal combustion engine, an electric power generator mechanically coupled to the engine, a sensor operable to generate a sensor signal representative of an observed engine speed, and a controller including a compensator. The engine drives the generator to provide AC electric power at a frequency within a selected range. The compensator is responsive to the sensor signal to determine a compensator input representative of a difference between the observed engine speed and a desired engine speed. The controller is further operable to determine one or more gain factors of a compensator with a control signal representative of engine load. The compensator is responsive to the input to generate an output signal as a function of the input and the one or more gain factors. Also included is a fueling device responsive to the output signal to provide fuel to the engine.

In another example, the system includes: an internal combustion engine, a sensor operable to generate a sensor signal representative of an observed engine speed, and a controller. The controller is responsive to the sensor signal to determine a control input representative of a difference between the observed engine speed and a desired engine speed. The controller defines a control that is one or more of a proportional-integral type, a proportional-derivate type, and a proportional-integral-derivate type. The controller is operable to determine one or more gain factors of the control with a controller signal corresponding to engine load. The control is responsive to the control input to generate an output signal as a function of the control input and the one or more gain factors. Also included is a fueling device responsive to the output signal to provide fuel to the engine.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
    driving an electric power generator with an internal combustion engine to provide AC electric power at a frequency within a selected range;
    regulating operation of the engine with a control to maintain the frequency of the electric power within the selected range during variation in engine load, which includes:
        providing an input signal to the control, the input signal being representative of a change in speed of the engine in response to the variation in engine load;
        determining one or more gain factors of the control as a function of a control signal representative of the engine load; and
        adjusting fuel provided to the engine in response to the control as a function of the input signal and the one or more gain factors of the control.

2. The method of claim 1, wherein the control signal represents an engine fueling value.

3. The method of claim 1, wherein the determining of the one or more gain factors includes selecting the one or more gain factors from a table stored in a memory.

4. The method of claim 1, which includes:
    sensing rotational engine speed;
    establishing the change in the speed of the engine based on the sensing of the rotational engine speed; and
    providing the electric power to an aircraft on the ground.

5. The method of claim 1, wherein the control includes a proportional-integral-derivative compensator and the one or more gain factors include a proportional gain factor, an integral gain factor, and a derivative gain factor.

6. The method of claim 5, which includes defining the proportional-integral-derivative compensator with a digital controller, the proportional gain factor operating to adjust a proportional gain of a proportional control of the compensator, the integral gain factor operating to adjust an integral gain of an integral control of the compensator, and the derivative gain factor operating to adjust a derivative gain of a derivative control of the compensator.

7. A method, comprising:
providing an internal combustion engine with one or more of a proportional-integral control, a proportional-derivative control, and a proportional-integral-derivative control;
generating an input control signal representative of a difference between a sensed engine speed and a desired engine speed;
determining one or more gain factors for the one or more of the proportional-integral control, the proportional-derivative control, and the proportional-integral-derivative control as a function of an engine fueling signal; and
controlling engine fueling in response to an output signal determined as a function of the one or more gain factors and the input control signal with the one or more of the proportional-integral control, the proportional-derivative control, and the proportional-integral-derivative control.

8. The method of claim 7, which includes:
driving an electric power generator with the engine to provide AC electric power at a desired frequency; and
regulating frequency by the controlling of the engine fueling in response to engine load change caused by the generator.

9. The method of claim 8, which includes providing the electric power to an aircraft on the ground.

10. The method of claim 7, wherein the engine is provided with the proportional-integral-derivative control and the gain factors include a proportional gain adjustment factor, an integral gain adjustment factor, and a derivative gain adjustment factor.

11. The method of claim 10, wherein the proportional-integral-derivative control is defined by programming instructions executed by a digital controller, and which includes:
sensing the observed engine speed; and
calculating the input signal with the digital controller.

12. A system, comprising:
an internal combustion engine;
an electric power generator mechanically coupled to the engine, the engine being operable to drive the generator to provide AC electric power at a frequency within a selected range;
a sensor operable to generate a sensor signal representative of an observed engine speed;
a controller including a compensator, the controller being responsive to the sensor signal to determine a compensator input signal representative of a difference between the observed engine speed and a desired engine speed, the controller being operable to determine one or more gain factors of the compensator with a control signal representative of engine load, the compensator being responsive to the compensator input signal to generate an output signal as a function of the compensator input signal and the one or more gain factors; and
a fueling device responsive to the output signal to provide fuel to the engine.

13. The system of claim 12, wherein the compensator input signal is representative of engine fueling.

14. The system of claim 12, wherein the compensator includes means for generating the output signal in accordance with a proportional-integral-derivative control.

15. The system of claim 12, wherein:
the one or more gain factors include at least one of a proportional control gain factor, an integral control gain factor, and a derivative control gain factor;
the control signal is an engine fueling signal;
the controller includes a memory and is operable to select the one or more gain factors from a table stored in the memory in response to the engine fueling signal.

16. A system, comprising:
an internal combustion engine;
a sensor operable to generate a sensor signal representative of an observed engine speed;
a controller responsive to the sensor signal to determine a control input representative of a difference between the observed engine speed and a desired engine speed, the controller defining a control that is one or more of a proportional-integral type, a proportional-derivative type, and a proportional-integral-derivative type, the controller being operable to determine one or more gain factors of the control with a controller signal corresponding to engine load, the control being responsive to the control input to generate an output signal as a function of the control input and the one or more gain factors; and
a fueling device responsive to the output signal to provide fuel to the engine.

17. The system of claim 16, further comprising an electric power generator mechanically coupled to the engine.

18. The system of claim 16, wherein:
the control is of the proportional-integral-derivative type;
the one or more gain factors include a proportional gain factor, an integral gain factor, and a derivative gain factor; and
the controller includes a memory storing data corresponding to the one or more gain factors and is operable to select the one or more gain factors based on the controller signal, the controller signal being indicative of engine fueling.

19. The system of claim 16, further comprising means for providing electric power to an aircraft on the ground, the providing means being mechanically coupled to the engine to be mechanically powered thereby.

20. The system of claim 16, wherein the controller includes a memory storing programming instructions and a processing unit, and the processing unit is operable to execute the programming instructions to calculate the control input, the controller signal, and the output signal from time-to-time.

* * * * *